United States Patent [19]
Bresky

[11] Patent Number: 5,046,540
[45] Date of Patent: Sep. 10, 1991

[54] TREE DELIMBING APPARATUS

[76] Inventor: Herbert Bresky, Box 938, Swan River, Manitoba, Canada, R0L 1Z0

[21] Appl. No.: 582,149

[22] Filed: Sep. 14, 1990

[51] Int. Cl.$^5$ .............................................. B27L 1/00
[52] U.S. Cl. ............................. 144/2 Z; 144/208 R; 144/343
[58] Field of Search ................... 144/2 Z, 3 D, 209 R, 144/209.5, 343

[56] References Cited

U.S. PATENT DOCUMENTS 3,690,352  8/1972  Herolf .
3,948,299  4/1976  Laforge et al. .
4,172,478  10/1979 Dakus .
4,368,764  1/1983  Peterson et al. .
4,371,016  2/1983  Bradshaw ........................... 144/2 Z

FOREIGN PATENT DOCUMENTS 1105363  7/1981  Canada .

Primary Examiner—W. Donald Bray
Attorney, Agent, or Firm—Adrian D. Battison; Stanley G. Ade; Murray E. Thrift

[57] ABSTRACT

A tree delimbing apparatus comprises a frame including mounting elements for supporting the frame on the front end of a conventional skidder. The frame includes four beams arranged in a rectangle with a front and a rear beam transverse to the direction of motion of the vehicle. Between the front and rear beams are mounted five delimber elements each supported on the underside of the front and rear beams and each including a hub and four blades which project radially outwardly from the hub. Each element is free to rotate around its axis with its blades passing close to but spaced from the next adjacent hub. The free rotation of the hubs provides an improved delimbing action.

9 Claims, 2 Drawing Sheets

TREE DELIMBING APPARATUS

BACKGROUND OF THE INVENTION

This invention relates to a tree delimbing apparatus of a type which can be mounted on a vehicle and moved over a plurality of trees in a longitudinal direction of the trees and includes a plurality of blades for stripping the limbs from the trees as the apparatus is moved along the trees.

Conventionally delimbing of the trees where necessary is carried out in many cases by inserting the tree into a separate fixed apparatus through which the tree is fed which includes suitable blades for stripping the limbs and leaving the bare trunk.

One proposal for a delimbing device for mounting on a vehicle is shown in Dakus U.S Pat. No. 4,172,478 which corresponds to Canadian Patent 1,105,363. This apparatus includes a frame which is attached to a vehicle of the type generally known as a skidder. The frame has a plurality of shafts mounted in parallel spaced relation with the shafts extending parallel to the direction of movement of the vehicle. Each shaft carries a single blade member which projects downwardly from the frame. The blade member is pivotally mounted on the shaft so that it can pivot around the axis of the shaft through a limited degree of movement moving to left or to right to accommodate the trees which sit generally between the blades. The blade is biased to an initial vertically depending position by a heavy spring arrangement mounted on the shaft so that the blade moves to left or to right only against the action of the spring.

This device solves some of the problems of the delimbing requirements but unfortunately is unsatisfactory for a number of reasons. Firstly the presence of the springs significantly increases the cost and complication of the device and furthermore the springs are prone to breakage and damage leading to increased maintenance costs. Secondly the delimbing action takes place generally only over the sides of the trees since the blades tend to remain in a substantially vertical orientation leaning only slightly to left or to right so that little or no possibility of the limbs on the underside of the tree being removed.

SUMMARY OF THE INVENTION

It is one object of the present invention therefore to provide an improved tree delimbing apparatus of this general type which overcomes or alleviates some or all of the above stated problems.

According to the invention, therefore, there is provided an apparatus for delimbing trees comprising a frame, means for mounting the frame on a vehicle for movement with the vehicle in a direction of movement longitudinally along a plurality of felled trees, and at least three delimbing elements mounted on the frame at spaced positions across the width of the frame and arranged to project from the frame for engaging and delimbing the trees, each delimbing element comprising a central hub portion, means mounting the hub portion on the frame for unrestricted rotational movement of the hub portion around an axis parallel to said direction of movement and at least three blade members projecting outwardly from the hub portion at spaced positions around the axis.

With the foregoing in view, and other advantages as will become apparent to those skilled in the art to which this invention relates as this specification proceeds, the invention is herein described by reference to the accompanying drawings forming a part hereof, which includes a description of the best mode known to the application and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
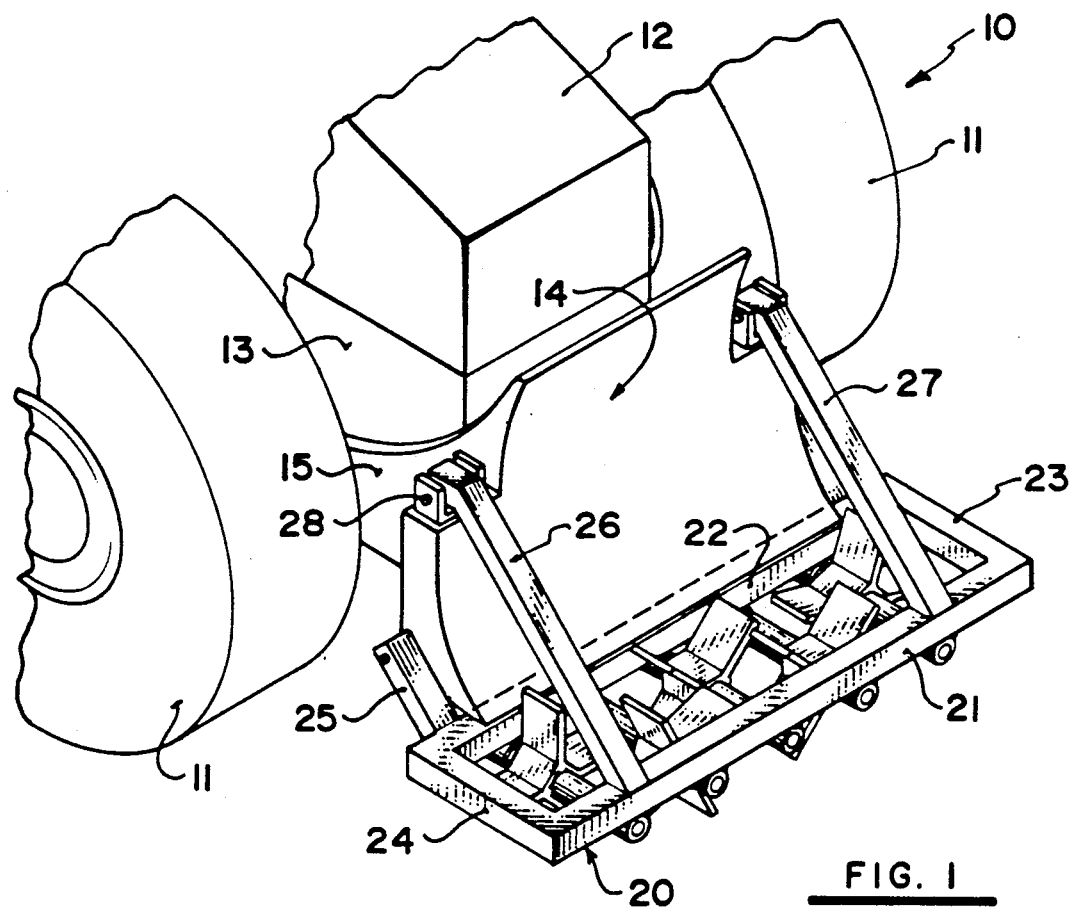
FIG. 1 is an isometric view of the front end of a skidder including a delimbing apparatus according to the invention.

A conventional skidder is shown in FIG. 1 indicated at 10 including front wheels 11, an engine compartment 12 and a frame structure 13. The skidder includes a conventional front blade member 14 mounted upon arms 15 which allow the blade member to be raised and lowered.

The delimbing apparatus according to the present invention comprises a frame structure 20 which includes a front cross beam 21, a rear cross beam 22 and two side beams 23 and 24 thus defining a horizontal rectangular open frame. The frame is connected to the blade member 14 of the skidder by a horizontal connecting flange 25 on a rear side of the rear frame beams 22 together with a pair of rearwardly and upwardly inclined struts 26 and 27 which connect to pins 28 at the top of the blade member.

The structure of the support elements for the frame are shown in little detail in view of the fact that these elements can be manufactured and designed in various different ways depending upon the specific type of vehicle to which the frame is to be attached.

In substance therefore the frame comprises simply the horizontal rectangular frame structure defined by the four right angle frame beams.

The frame supports five delimbing elements each generally indicated at 30. Each delimbing element comprises a pair of sleeves 31 and 32 each of which is welded to the underside of a respective one of the cross beams 21 and 22. The sleeves are aligned and define a rotational axis for a hub member 33 which includes a cylindrical portion 34 which is attached to a central shaft 35 which extends axially of the cylindrical portion and projects outwardly from the ends for cooperation with the sleeves 31 and 32 to allow the required rotation of the hub member.

Figure 3:
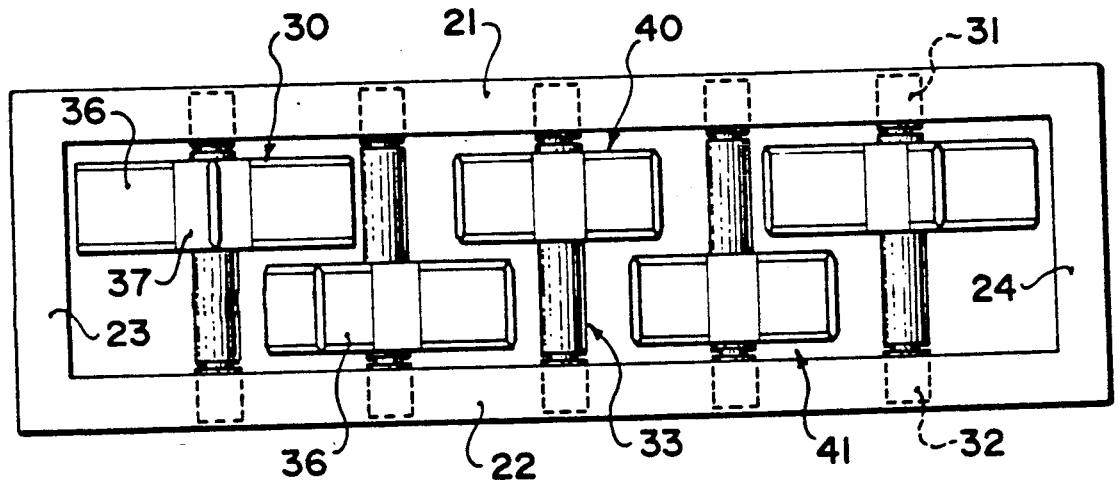
FIG. 3 is a top plan view of the delimbing apparatus.
Figure 4:
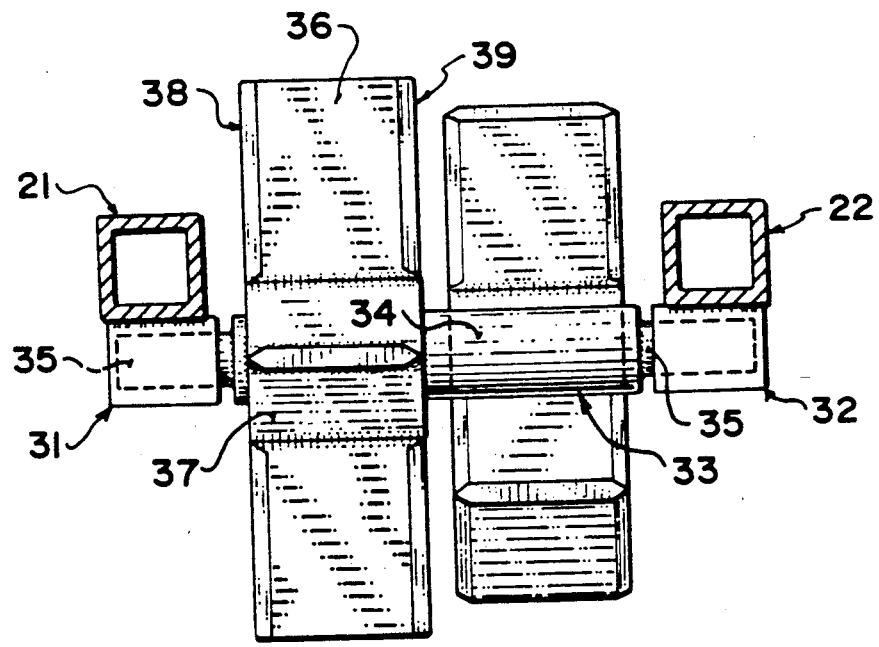
FIG. 4 is a cross-sectional view along the lines 4—4 of FIG. 2.

The cylindrical portion 34 has welded on the outside surface thereof four blades 36 which project radially outwardly from the cylindrical portion. Each blade member 36 comprises a substantially flat plate which lies in an axial plane with the blade members being spaced equiangularly around the axis that is at 90° spacing. The blades are supported in their position at the required spacing by spacer elements 37 each of which extends from one blade to the next blade to provide vigorous structural support for the blades in view of the vigorous action involved in delimbing. The front and rear edges of each blade is sharpened as indicated at 38 and 39. The length of the blades is such that the outer end of each blade as it rotates around the respective hub passes closely adjacent to but spaced from the hub of the next adjacent delimber element. In order to allow the blades to pass without interference between the blades of one and the blades of the next adjacent hub, as best shown in FIG. 3 the blades of the first, third and fifth delimber element are positioned at the front of the frame and the blades of the second and fourth element are positioned at the rear of the frame. The distance between the cross beams 21 and 22 is such that it can just accommodate the front ones of the blades and also the rear ones of the blades. The hubs are all aligned and are parallel so that each extends in the direction of movement of the frame.

Figure 2:
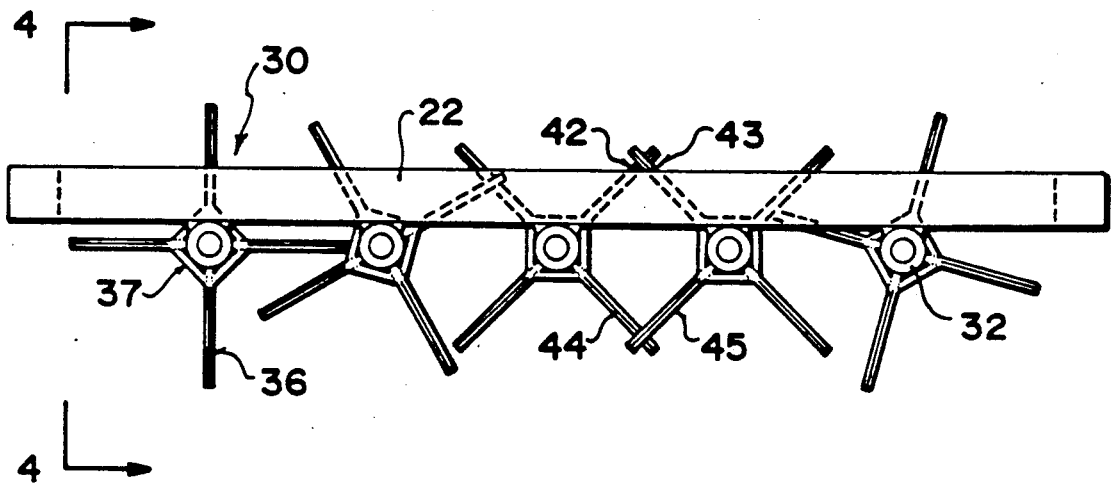
FIG. 2 is a front elevational view of the delimbing apparatus.

It will be appreciated therefore that each of the delimber elements can be rotated freely around its axis without restriction and without any forces tending to bias it toward an initial or rest position. Each of the elements can therefore take up any required orientation and the rest positions tend to be in random position as shown in FIG. 2.

The number of blades on each element is certainly at least three with four being the preferred number as this provides the desired geometry. Five of the delimber elements are shown but it will be appreciated that there can be more such elements or less such elements as required with a minimum number being three.

In operation the blades take up a position depending upon their impact upon and movement along the trees underlying the frame. The blades can thus move along the trunk of the tree stripping the limbs from the tree. As best shown in FIG. 2, the elements indicated at 40 and 41 have taken up a particular orientation in which the blades 42 and 43 cross above the axis of the elements and the blades 44 and 45 cross below the axis of the elements. This defines an area in which a trunk can be confined with the delimbing action taking place on top of the trunk and beneath the trunk as the blades 44 and 45 particularly slide underneath the trunk. The fact that the axis of the rotation of the delimber elements are positioned beneath the cross member 22 enables the crossing action of the blades 44 and 45 to take place most effectively and to ensure as far as possible that these blades pass underneath the tree to provide a complete delimbing action.

To allow a tree to be confined in the area between the crossed blades, it is desirable that the spacing of each delimber element from the next be slightly greater than the expected diameter of the trees to be processed.

The embodiment described above has the following advantages relative to the prior art stated above:

(1) The delimbing elements are free to rotate without the restriction of springs. Thus the common and repeated breakage of springs is prevented.

(2) The crossing action of the blades as described above allows the delimbing action to take place underneath the tree rather than merely on the sides of the tree.

(3) The absence of the springs allows the device to be manufactured in a manner which is more rugged and less expensive.

(4) The unit is entirely self cleaning in that the free rotation of the elements allows any limbs trapped in the frame to drop out of the frame.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. An apparatus for delimbing trees comprising a frame, means for mounting the frame on a vehicle for movement with the vehicle in a direction of movement longitudinally along a plurality of felled trees, and at least three delimbing elements mounted on the frame at spaced positions across the width of the frame and arranged to project from the frame for engaging and delimbing the trees, each delimbing element comprising a central hub portion, means mounting the hub portion on the frame for unrestricted rotational movement of the hub portion around an axis parallel to said direction of movement and at least three blade members projecting outwardly from the hub portion at spaced positions around the axis.

2. The invention according to claim 1 wherein the blade members are equiangularly spaced around the axis.

3. The invention according to claim 1 wherein the blade members each lie in an axial plane.

4. The invention according to claim 1 wherein each blade member has a front and a rear cutting edge.

5. The invention according to claim 1 wherein each delimbing element has four blade members arranged at 90° spacing around the axis.

6. The invention according to claim 1 wherein the frame includes a substantially horizontal cross member arranged transverse to the direction of movement and wherein the axis of rotational movement of each of the delimbing elements is arranged in a common horizontal plane which is below the cross member.

7. The invention according to claim 6 wherein each delimbing element includes a sleeve portion welded to an underside of the cross member, the sleeve member defining a bushing for rotation of the hub member.

8. The invention according to claim 1 wherein the frame includes a front horizontal cross member and a rear horizontal cross member spaced rearwardly of the front member, the hub members being positioned in aligned relationship between the front member and the rear member.

9. The invention according to claim 1 wherein the blade members of each delimbing element are offset in a forward to rearward direction relative to the blade members of the next adjacent delimbing element and wherein the length of the blade members are such that each blade member when rotating around the respective rotational axis passes closely adjacent to but slightly spaced from the hub member of the next adjacent delimbing element.

* * * * *